United States Patent Office 2,716,134
Patented Aug. 23, 1955

2,716,134

N,N,N',N'-TETRASUBSTITUTED DIAMINES

Delbert D. Reynolds and Thomas T. M. Laakso, Rochester, N. Y., assignors to Eastman Kodak Company, Rochester, N. Y., a corporation of New Jersey No Drawing. Application April 19, 1950,
Serial No. 156,934

7 Claims. (Cl. 260—570.5)

This invention relates to N,N,N',N'-tetrasubstituted diamines and to a process for their preparation.

Various methods have been proposed heretofore for the preparation of tetrasubstituted diamines. For example, Freund et al., in Berichte der Deutsch. Chem., vol. 30, page 1385 (1897), proposed the preparation of N,N,N',N'-tetramethyl ethylene diamine by heating ethylene bromide with dimethylamine in a closed tube at 100° C., while Knorr et al., ibid, vol. 39, page 1428 (1906), proposed the preparation of N,N,N',N'-tetramethyl trimethylene diamine by heating trimethylene bromide with alcoholic dimethylamine at 150° C. More recently, Gilman and Pickens, in J. Amer. Chem. Soc., vol. 47, pages 245–54 (1925), have described the preparation of N,N,N',N'-tetraethyl ethylene diamine by boiling a mixture of β-chloroethylbenzene sulfonate and diethylamine. However, the prior art processes have given relatively low yields and the intermediates for preparing tetrasubstituted diamines with longer carbon chains are not readily available.

We have now found that tetrasubstituted diamines having the general formulas:

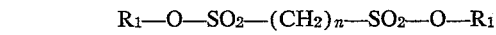

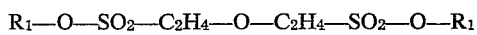

and

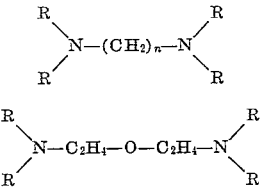

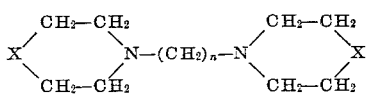

wherein $n$ represents a positive integer of from 2 to 6, each R can be the same or different members selected from the group consisting of an alkyl group containing from 1 to 18 carbon atoms (e. g. methyl, ethyl, isopropyl, propyl, n-butyl, isobutyl, sec. butyl, tert. butyl, etc. groups), a cycloalkyl group containing from 5 to 6 carbon atoms (e. g. cyclopentyl or cyclohexyl groups), an aryl group (e. g. phenyl, p-tolyl, o-tolyl, etc.) or an aralkyl group (e. g. benzyl, phenylethyl, etc. groups) and X represents —CH₂— or O, can be prepared in a convenient and economic was by reacting a glycol disulfonate with a secondary amine and separating the tetrasubstituted diamine which forms. The above-defined diamines are useful as intermediates in the preparation of other organic compounds, for example, in the preparation of quaternized polymeric sulfonates which are applicable as mordants in certain photographic color processes. They are also valuable in the preparation of various insecticides and as pharmaceutical chemicals.

It is, accordingly, an object of the invention to provide a convenient and economic way for obtaining tetrasubstituted diamines. Another object is to provide a series of new tetrasubstituted diamines. Other objects will become apparent hereinafter.

In accordance with our invention, glycol disulfonates having the general formulas:

$$R_1\text{—O—SO}_2\text{—(CH}_2)_n\text{—SO}_2\text{—O—}R_1$$

and $$R_1\text{—O—SO}_2\text{—C}_2H_4\text{—O—C}_2H_4\text{—SO}_2\text{—O—}R_1$$

wherein $n$ represents a positive integer as previously defined and $R_1$ represents an alkyl group containing from 1 to 4 carbon atoms or an aryl group, are heated with a secondary amine having the general formula:

wherein each R can be the same or different groups as previously mentioned, distilling off the excess amine, if desired, after the reaction is completed, adding an excess of an aqueous alkali metal hydroxide (e. g. sodium, potassium or lithium hydroxide), separating the oil layer which thereupon forms and recovering the tetrasubstituted diamine by fractional distillation of the oil layer. Advantageously the water layer can be extracted with a water-insoluble solvent such as benzene, diethyl ether, etc. in which case, the oil layer and the extract are combined and dried over a dehydrating agent such as sodium hydroxide pellets, anhydrous potassium carbonate, etc., and then fractionally distilled. For maximum yields, it is essential that the reactants be thoroughly dried and reacted under strictly anhydrous conditions. Advantageously, an inert solvent such as dry benzene, 1,4-dioxane, toluene or xylene is employed as the reaction medium where the reactants are not readily compatible with one another. The amount of the secondary amine employed in the reaction can be varied widely from 4 to 25 mol weights of the amine to each mol weight of the glycol disulfonate, but for the most efficient operation from 15 to 20 mol weights of the amine are used for each mol weight of the glycol disulfonate. The excess of the amine can be recovered and used in succeeding runs or recycled in continuous operation. The temperature of the reaction can vary from 50° to 150° C., but preferably it is conducted at the temperature corresponding to the refluxing or boiling temperature of the amine or of the inert solvent medium or their mixtures. The caustic alkali employed to neutralize the reaction mixture, after the reaction has been completed, can be varied from just enough caustic alkali to neutralize all of the acid groups released in the reaction and to free the tetrasubstituted amine from its salts, that is, from 2 to 15 mol weights of the caustic alkali to each mol weight of the glycol disulfonate, but preferably from 5 to 10 mol weights of the caustic alkali to each mol weight of the glycol disulfonate. Advantageously, an aqueous solution of the caustic alkali is employed. Where an inert solvent is employed as the reaction medium, the total concentration of reactants can vary within any practical limits, it being possible to operate at concentrations which contain as low as 10% and as high as 75% of reactants.

Suitable secondary amines which can be employed in the practice of our invention are dialkylamines such as dimethylamine, diethylamine, diisopropylamine, di-n-propylamine, di-n-butylamine, dihexylamine, didodecylamine, distearylamine, etc., mixed dialkylamines such as methylethylamine, methyl propylamine, methylisopropylamine, methyl n-butylamine, ethyl propylamine, ethyl n-butylamine, methyl dodecylamine, etc., diarylamines such as diphenylamine, di-p-tolylamine, etc., diaralkylamines such as dibenzylamine, di-ethylphenylamine, etc. and dicycloalkylamines such as dicyclophentylamine, dicyclohexylamine, etc. Suitable glycol disulfonates can be prepared by condensing the appropriate sulfonyl chloride with the alkylene glycol or with diethylene glycol as illustrated hereinafter. Among such suitable glycol disulfonates are 1,2-di(methanesulfonoxy) ethane, 1,2-di-(ethanesulfonoxy) ethane, 1,3-di(methanesulfonoxy) propane, 1,4 - di - (methanesulfonoxy)butane, 1,5 - di - (methanesulfonoxy) pentane, 2,5-di(methanesulfonoxy) hexane, 1,2-di(benzenesulfonoxy) ethane, 1,3-di(benzenesulfonoxy) propane, 1,4-di(benzenesulfonoxy) butane, 1,2-di(p-toluenesulfonoxy) ethane, 1,3-di(p-toluenesulfonoxy) propane, 1,4-di(p-toluenesulfonoxy) butane, β,β'-di(benzene sulfonoxy) diethyl ether, etc.

The following examples will serve further to illustrate the tetrasubstituted diamines of the invention and the manner of preparing the same.

PREPARATION OF GLYCOL DISULFONATES

A number of glycol disulfonate intermediates were prepared by dissolving 1 mol of the desired anhydrous glycol in 3 to 5 volumes of anhydrous pyridine and 2 mols of the appropriate sulfonyl chloride were added to this well-stirred solution at such a rate as to keep the temperature between 5° and 15° C. After the reaction was completed, the reaction mixture was stirred into three times its volume of finely crushed ice. The crystalline product which separated was washed with ice water and then dried. It was purified by recrystallization from ethanol. The following table shows a number of glycol disulfonates prepared by the above-described method. Other glycol disulfonates can be prepared in similar manner by selecting the desired sulfonyl chloride. In the table, the first column shows the glycol which is reacted with the appropriate sulfonyl chloride to give the glycol disulfonate corresponding thereto and shown in the second column, while the other columns show the melting points, analyses and yields of the respective sulfonate derivatives.

residual oil having a boiling point of 89°/31.5 mm. The yield of product was 40 g. equivalent to 79.5% of theory.

ANALYSIS

|   | Found | Calculated |
|---|---|---|
|   | Percent | Percent |
| C | 70.3 | 70.0 |
| H | 14.1 | 13.7 |
| N | 16.7 | 16.7 |

*Example 2.—N,N,N',N'-tetraisopropyl trimethylene diamine*

606 g. (6 mol) of diisopropylamine and 115 g. (0.32 mol) of anhydrous 1,3-di(benzenesulfonoxy) propane were placed in a 2-liter flask equipped with a calcium chloride vent tube, a variable take-off still head and a receiver, and the mixture refluxed for 20 hours. Most of the amine (excess) was distilled off, 56 g. of potassium hydroxide dissolved in 300 cc. of water was added and the mixture warmed until all of the solids went into solution. 300 cc. of benzene were then added, and the benzene layer which separated was dried over 40 g. of potassium hydroxide pellets and distilled through a fractionating column. There were obtained 60 g. of N,N,N',N'-tetraisopropyl trimethylene diamine, equivalent to 85.7% of theory, having a boiling point of 83°/0.25 mm.

ANALYSIS

|   | Found | Calculated |
|---|---|---|
|   | Percent | Percent |
| C | 74.8 | 74.5 |
| H | 13.8 | 14.0 |
| N | 11.5 | 11.5 |

TABLE

| Glycol | Sulfonate Derivative | M. P., °C. | Analysis Calc'd. | Analysis Found | Yield, percent |
|---|---|---|---|---|---|
| Ethylene glycol | 1,2-Di-(benzenesulfonoxy) ethane | 48-50 | C, 49.2<br>H, 4.1<br>S, 18.6 | 49.4<br>4.2<br>18.3 | 64.7 |
| Propane-1,3-diol | 1,3-Di-(p-toluenesulfonoxy) propane | 92-93 | C, 53.2<br>H, 5.2<br>S, 16.8 | 52.9<br>5.2<br>16.5 | 69.4 |
| Butane-1,4-diol | 1,4-Di-p-toluenesulfonoxy) butane | 81-82 | C, 54.3<br>H, 5.5<br>S, 16.1 | 54.3<br>5.5<br>15.9 | 67.0 |
| Pentane-1,5-diol | 1,5-Di-(methanesulfonoxy) pentane | 35-36 | C, 32.4<br>H, 6.1<br>S, 24.6 | 32.3<br>6.1<br>24.2 | 82.7 |
| Hexane-2,5-diol | 2,5-Di-(benzenesulfonoxy) hexane | 104-105 | C, 54.3<br>H, 5.5<br>S, 16.1 | 54.2<br>5.3<br>16.3 | 73.7 |
| Diethylene glycol | β,β'-Di-(benzenesulfonoxy) diethyl ether | 38-39 | C, 49.7<br>H, 4.6<br>S, 16.6 | 49.6<br>4.7<br>16.7 | 66.1 |
| Butane-1,3-diol | 1,3-Di-(p-toluenesulfonoxy) butane | 58-59 | C, 54.3<br>H, 5.5<br>S, 16.1 | 54.6<br>5.5<br>16.4 | 77.0 |

*Example 1.—N,N,N',N'-tetraethyl ethylene diamine*

400 g. (5.48 mol) of diethylamine were boiled under reflux and 100 g. (0.29 mol) of 1,2-di(benzenesulfonoxy) ethane in 200 g. of dry dioxane were added over a period of 4 hours. Most of the amine (excess) was then distilled off and 60 g. of sodium hydroxide pellets in 300 cc. of water added. The distillation was then continued to a temperature of from 93° to 95° C., when the reaction mixture was cooled and extracted with three times its volume of diethyl ether. The ether extract was dried over anhydrous potassium carbonate, filtered and concentrated. The concentrate was then fractionated to give a

*Example 3.—1,3-(diisopropylamino) butane*

606 g. (6 mol) of diisopropylamine and 133 g. (0.33 mol) of 1,3-di (p-toluenesulfonoxy) butane were placed in a 2 liter, 2-necked flask, equipped with an 18" packed column, a variable take-off still head and protected from moisture with a calcium chloride tube, and refluxed for 20 hours. The excess of diisopropylamine was distilled off, 40 g. of sodium hydroxide dissolved in 600 cc. of water was added to the mixture, followed by the addition of 1 liter of benzene. The benzene layer was then extracted with aqueous 5% hydrochloric acid, and the acid extract then made alkaline by the addition of sufficient aqueous 33% sodium hydroxide solution. The alkaline solution was extracted with 2 liters of benzene, the extract dried over sodium hydroxide pellets and the benzene then removed by distillation of the mixture. The residual oil was distilled through a column using a variable still head take-off, to give a yield of 65% of theory of 1,3-(diisopropylamino) butane having a boiling point of 85°–87° C./1 mm.

ANALYSIS

|   | Found | Calculated |
|---|---|---|
|   | Percent | Percent |
| C | 74.5 | 75.0 |
| H | 14.1 | 14.0 |
| N | 10.7 | 11.0 |

*Example 4.—N,N,N',N'-tetra-n-butyl tetramethylene diamine*

600 g. (4.64 mol) of di-n-butylamine and 100 g. (0.25 mol) of 1,4-di (p-toluenesulfonoxy) butane were refluxed for 20 hours in an apparatus similar to that described in Example 3. The excess of di-n-butylamine was removed by distillation and 56 g. of potassium hydroxide in 300 cc. of water were added to the residual mixture. The oily layer which separated was drawn off, the aqueous layer extracted three times with 300 cc. of benzene and combined with the drawn-off oil. The combined material was dried over sodium hydroxide pellets and fractionally distilled. The N,N,N',N'-tetra-n-butyl tetramethylene diamine was obtained as a light yellow oil boiling at 107°–108° C./0.3 mm. The yield was 77.5% of theory.

ANALYSIS

|   | Found | Calculated |
|---|---|---|
|   | Percent | Percent |
| C | 77.1 | 77.0 |
| H | 14.0 | 14.1 |
| N | 9.2 | 9.0 |

*Example 5.—N,N,N',N'-tetracyclohexyl ethylene diamine*

543 g. (3.0 mol) of dicyclohexylamine were boiled under reflux conditions and 51 g. (0.15 mol) of 1,2-di (benezenesulfonoxy) ethane in 500 cc. of dry dioxane were added to the boiling dicyclohexylamine over a period of 4 hours. Most of the amine (excess) was distilled off, 60 g. of sodium hydroxide in 300 cc. of water added and the distillation continued until a residual cloudy oil remained. This was poured into 200 cc. of Skellysolve (a low boiling saturated hydrocarbon B. P. 41°–69° C.), the mixture heated to boil, decolorizing charcoal added and the mixture filtered through kieselguhr. The filtrate was then chilled to give white, needle-like crystals having a melting point of 102° to 104° C. A yield of 85.9% of theory was obtained.

ANALYSIS

|   | Found | Calculated |
|---|---|---|
|   | Percent | Percent |
| C | 80.5 | 80.4 |
| H | 12.2 | 12.3 |
| N | 7.0 | 7.2 |

*Example 6.—N,N,N',N'-tetraphenyl trimethylene diamine*

1014 g. (6.0 mol) of diphenylamine and 128 g. (0.36 mol) of 1,3-di (benzenesulfonoxy) propane in one liter of dry technical xylene were refluxed for a period of 20 hours. The low boilers were distilled off and distillation then continued at 180°–183° C./23 mm., until most of the excess amine was removed. Then 40 g. of sodium hydroxide in 600 cc. of water was added to the residue. An oil layer separated. This was drawn off and the water layer extracted with several changes of benzene. The oil and benzene solutions were combined, washed with water and dried over solid sodium hydroxide pellets. The oil and benzene solution was distilled up to 183° C./23 mm., and then the residual oil was fractionated through a glass packed column with a variable take-off head. The main cut was taken off at 148° to 155° C./.04 mm. On redistillation of the latter, there was obtained a yield of 64.8% of theory of N,N,N',N'-tetraphenyl trimethylene diamine, a yellow oil boiling at 118°–121° C./0.3 mm.

ANALYSIS

|   | Found | Calculated |
|---|---|---|
|   | Percent | Percent |
| C | 85.3 | 85.7 |
| H | 7.0 | 6.9 |
| N | 7.0 | 7.4 |

*Example 7.—2,5-(dimorpholino) hexane*

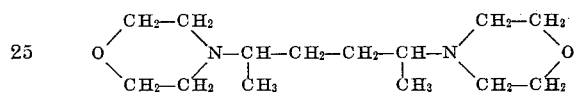

522 g. (6.0 mol) of morpholine and 120 g. (0.3 mol) of 2,5-di (benzenesulfonoxy) hexane were heated together under reflux conditions in a 2 liter, 2-necked flask, equipped with an 18″ glass packed column, variable constant take-off still head and protected from moisture by a calcium chloride tube, for a period of 20 hours. The excess of morpholine was distilled off, 40 g. of sodium hydroxide dissolved in 600 cc. of water was added to the residue and the mixture stirred. The oily layer which formed was separated and the water layer was extracted several times with benzene. The oil and benzene extract were combined, dried over sodium hydroxide pellets and then fractionally distilled. The 2,5-(dimorpholino) hexane was obtained as a light yellow, viscous oil in 66.5% of theory yield and having a boiling point of 130°–132° C./0.3 mm.

ANALYSIS

|   | Found | Calculated |
|---|---|---|
|   | Percent | Percent |
| C | 64.7 | 65.1 |
| H | 10.6 | 10.9 |
| N | 11.0 | 10.8 |

*Example 8.—N,N'-dipiperidyl pentamethylene diamine*

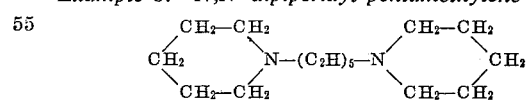

850 g. (10 mol) of piperidine were heated to reflux temperature in a 2-necked flask, equipped with a column, a variable take-off still head and a dropping funnel, and 130 g. (0.50 mol) of 1,5-di (methanesulfonoxy) pentane in 1000 cc. of dry dioxane was added over a period of 4 hours. Most of the piperidine (excess) was removed by distillation. Then 60 g. of sodium hydroxide dissolved in 300 cc. of water were added and the distillation continued until all the low boiling substances had been removed. The mixture was cooled and the oily layer which separated was drawn off. The water layer was extracted with diethyl ether and the extract combined with the oil. The ether and oil were dried over sodium hydroxide pellets and fractionated. The N,N'-dipiperidyl pentamethylene diamine was obtained as a light yellow oil having a boiling point of 110° C./0.5 mm. The yield was 25% of theory.

ANALYSIS

| | Found | Calculated |
|---|---|---|
| | Percent | Percent |
| C | 75.4 | 75.6 |
| H | 12.7 | 12.6 |
| N | 11.9 | 11.7 |

Example 9.—β,β'-(Diisopropylamino) diethyl ether.

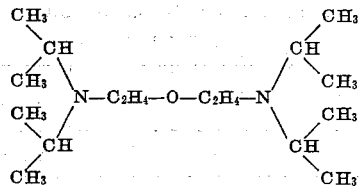

606 g. (6.0 mol) of diisopropylamine were placed in a 3 liter flask, equipped with a glass packed column and variable take-off still head, a stirrer (sealed), a dropping funnel and protected from external moisture by calcium chloride tubes, and heated to boiling temperature. While stirring vigorously, there were slowly added 121 g. (0.31 mol) of β,β'-di-(benzenesulfonoxy) diethyl ether dissolved in 500 cc. of dry dioxane. The reaction mixture was stirred and refluxed for 20 hours. The excess of diisopropylamine and the dioxane removed by distillation. The residue was treated with 20 g. of sodium hydroxide in 600 cc. of water. An oily layer formed which was drawn off. The water layer was extracted with benzene. The oil and the benzene extract were then combined and dried over anhydrous potassium carbonate and distilled twice through a modified Claisen flask. The β,β'-(diisopropylamino) diethyl ether was obtained as a colorless oil in yield of 65% of theory and having a boiling point of 96.5° C./0.5 mm.

ANALYSIS

| | Found | Calculated |
|---|---|---|
| | Percent | Percent |
| C | 70.9 | 70.5 |
| H | 13.2 | 13.2 |
| N | 10.3 | 10.4 |

In place of the diisopropylamine in the above example, there can be substituted a molecularly equivalent amount of methylphenylamine to give β,β'-(di-methylphenylamino) diethyl ether or of dicyclohexylamine to give β,β'-(dicyclohexylamino) diethyl ether or of diphenylamine to give β,β'-(diphenylamino) diethyl ether.

Example 10.—β,β'-(Diethylamino) diethyl ether

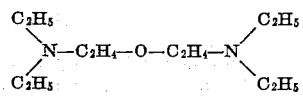

438 g. (6.0 mol) of diethylamine and 128.6 g. (0.33 mol) of β,β'-di-(benzenesulfonoxy) diethyl ether were heated and stirred together at reflux temperature for a period of 4 hours. The excess diethylamine was removed by distillation of the reaction mixture. There were then added to the residue 60 g. of sodium hydroxide dissolved in 300 cc. of water. The oily layer which separated from the mixture was drawn off and the water layer extracted several times with diethyl ether. The oil and ether extract were combined, and dried over sodium hydroxide pellets. The ether was removed by distillation and the residual oil fractionated. The β,β'-(diethylamino) diethyl ether was obtained as a very light yellow oil having a boiling point of 69°–70°/1 mm. The yield was 13% of theory.

ANALYSIS

| | Found | Calculated |
|---|---|---|
| | Percent | Percent |
| C | 66.6 | 66.6 |
| H | 12.8 | 12.9 |
| N | 13.1 | 12.9 |

By proceeding as described in the above examples, other tetrasubstituted diamines can also be prepared in excellent yields. For example, N-methylaniline with 1,4-di-(p-toluene sulfonoxy) butane gives N,N'-dimethyl-N,N'-diphenyl tetramethylene diamine and dibenzylamine with 1,5-di-(methanesulfonoxy) pentane gives N,N,N',N'-tetrabenzyl pentamethylene diamine.

What we claim is:

1. A process for preparing a tetrasubstituted diamine having the general formula:

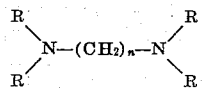

wherein $n$ represents a positive integer of from 2 to 6 and each R represents a member selected from the group consisting of an alkyl group containing from 1 to 4 carbon atoms, a cyclohexyl group and a phenyl group, comprising heating at a temperature of from 50° to 150° C. a glycol disulfonate having the general formula:

$$R_1-O-SO_2-(CH_2)_n-SO_2-O-R_1$$

wherein $n$ has the above meaning and $R_1$ represents the same member selected from the group consisting of an alkyl group containing from 1 to 4 carbon atoms, a phenyl group and a tolyl group, with a secondary amine having the general formula:

wherein each R has the above meaning, in the ratio of from 4 to 25 mol weights of the secondary amine to each mol weight of the said glycol disulfonate, then adding an aqueous solution of an alkali metal hydroxide to the reaction mixture in the ratio of from 2 to 15 mol weights of the alkali metal hydroxide to each mol weight of the said glycol disulfonate, and separating the tetrasubstituted diamine which forms from the reaction mixture.

2. A process for preparing N,N,N',N'-tetraethyl ethylene diamine comprising heating at a temperature of from 50° to 150° C. 1,2-di(benzenesulfonoxy) ethane with diethylamine in the ratio of from 15 to 20 mol weights of the diethylamine to each mol weight of the 1,2-di(benzenesulfonoxy) ethane, then adding an aqueous solution of an alkali metal hydroxide to the reaction mixture in the ratio of from 2 to 15 mol weights of the alkali metal hydroxide to each mol weight of the 1,2-di(benzenesulfonoxy) ethane, and separating the N,N,N',N'-tetraethyl ethylene diamine which forms from the reaction mixture.

3. A process for preparing N,N,N',N'-tetraisopropyl trimethylene diamine comprising heating at a temperature of from 50° to 150° C. 1,3-di(benzenesulfonoxy) propane with diisopropylamine in the ratio of from 15 to 20 mol weights of the diisopropylamine to each mol weight of the 1,3-di(benzenesulfonoxy) propane, then adding an aqueous solution of an alkali metal hydroxide to the reaction mixture in the ratio of from 2 to 15 mol weights of the alkali metal hydroxide to each mol weight of the 1,3-di(benzenesulfonoxy) propane, and separating the N,N,N',N'-tetraisopropyl trimethylene diamine which forms from the reaction mixture.

4. A process for preparing N,N,N',N'-tetracyclohexyl ethylene diamine comprising heating at a temperature of from 50° to 150° C. 1,2-di(benzenesulfonoxy) ethane with dicyclohexylamine in the ratio of from 15 to 20 mol weights of the dicyclohexylamine to each mol weight of the 1,2-di(benzenesulfonoxy) ethane, then adding an aqueous solution of an alkali metal hydroxide to the reaction mixture in the ratio of from 2 to 15 mol weights of the alkali metal hydroxide to each mol weight of the 1,2-di(benzenesulfonoxy) ethane, and separating the N,N,N',N'-tetracyclohexyl ethylene diamine which forms from the reaction mixture.

5. A process for preparing N,N,N',N'-tetraethyl ethylene diamine comprising heating at a temperature of from 50° C. to 150° C. 1,2-di(benzenesulfonoxy) ethane with diethylamine in the ratio of from 15 to 20 mol weights of the diethylamine to each mol weight of the 1,2-di(benzenesulfonoxy) ethane, then adding an aqueous solution of an alkali metal hydroxide to the reaction mixture in the ratio of from 5 to 10 mol weights of the alkali metal hydroxide to each mol weight of the 1,2-di(benzenesulfonoxy) ethane, and separating the N,N,N'N'-tetraethyl ethylene diamine which forms from the reaction mixture.

6. A process for preparing N,N,N',N'-tetra-n-butyl-tetramethylene diamine comprising heating at a temperature of from 50° to 150° C. 1,4-di (p-toluenesulfonoxy)butane with di-n-butylamine in the ratio of from 15 to 20 mol weights of the di-n-butylamine to each mol weight of the 1,4-di (p-toluenesulfonoxy)butane, then adding an aqueous solution of an alkali metal hydroxide to the reaction mixture in the ratio of from 2 to 15 mol weights of the alkali metal hydroxide to each mol weight of the 1,4-di(p-toluenesulfonoxy) butane, and separating the N,N,N',N'-tetra-n-butyl tetramethylene diamine which forms the reaction mixture.

7. A process for preparing N,N,N',N'-tetrapheny l trimethylene diamine comprising heating at a temperature of from 50° to 150° C. 1,3-di(benzenesulfonoxy) propane with diphenylamine in the ratio of from 15 to 20 mol weights of the diphenylamine to each mol weight of the 1,3-di(benzenesulfonoxy) propane, then adding an aqueous solution of an alkali metal hydroxide to the reaction mixture in the ratio of from 2 to 15 mol weights of the alkali metal hydroxide to each mol weight of the 1,3-di(benzenesulfonoxy) propane, and separating the N,N,N',N'-tetraphenyl trimethylene diamine which forms from the reaction mixture.

References Cited in the file of this patent

UNITED STATES PATENTS

| | | |
|---|---|---|
| 2,261,002 | Ritter | Oct. 28, 1941 |
| 2,279,294 | Hardman | Apr. 14, 1942 |
| 2,464,199 | Elderfield et al. | Mar. 15, 1949 |

FOREIGN PATENTS

| | | |
|---|---|---|
| 518,592 | Great Britain | Mar. 1, 1940 |
| 536,017 | Great Britain | Apr. 30, 1941 |

OTHER REFERENCES

Gilman et al.: J. Am. Chem. Soc., vol. 47 (1925), p.249.

Anderson et al.: J. Am. Chem Soc., vol. 61 (1939), pp. 3440-1.

Degering et al.: "An Outline of Org. Nitrogen Compounds" (1945), p. 201.